United States Patent [19]
Yoshimatsu et al.

[11] Patent Number: 5,615,388
[45] Date of Patent: Mar. 25, 1997

[54] IC CARD READER/WRITER

[75] Inventors: Kenzo Yoshimatsu, Kawasaki; Hirobumi Kessoku, Yokohama; Atsushi Murata, Chigasaki, all of Japan

[73] Assignee: Kabushiki Kaisha Toshiba, Kawasaki, Japan

[21] Appl. No.: 348,984

[22] Filed: Nov. 28, 1994

[30] Foreign Application Priority Data

Nov. 29, 1993 [JP] Japan .................... 5-298643

[51] Int. Cl.$^6$ ...................... G06F 13/00
[52] U.S. Cl. .......................... 395/821; 235/380
[58] Field of Search .................. 395/821, 835, 395/891, 833, 442, 282, 283, 284, 286; 235/445, 380

[56] References Cited

U.S. PATENT DOCUMENTS

| | | | |
|---|---|---|---|
| 4,065,662 | 12/1977 | Garezynski et al. | 235/419 |
| 4,791,285 | 12/1988 | Ohki | 235/449 |
| 4,803,351 | 2/1989 | Shigenaga | 235/492 |
| 4,972,470 | 11/1990 | Farago | 380/3 |
| 5,086,388 | 2/1992 | Matoba et al. | 395/891 |
| 5,161,231 | 11/1992 | Iijima | 395/800 |
| 5,365,047 | 11/1994 | Yamaguchi | 235/380 |
| 5,378,944 | 1/1995 | Gochi | 326/62 |
| 5,414,835 | 5/1995 | Iijima | 395/550 |

*Primary Examiner*—Ayaz R. Sheikh
*Attorney, Agent, or Firm*—Cushman, Darby & Cushman Ip Group of Pillsbury Madison & Sutro LLP

[57] ABSTRACT

In an IC card reader/writer of the present invention including a control section for controlling a power supply to a detachable IC card, a supply of an operation clock, a reset thereof, and an I/O branch section for receiving/transmitting serial data from/to the IC card, wherein a signal is received/transmitted between a personal computer and the control section and data is received/transmitted between the personal computer and the I/O branch section, the IC card reader/writer comprises a serial-parallel converter for mutually converting serial data receiving/transmitting from/to the IC card and parallel data receiving/transmitting from/to the personal computer, an access control section connected to the personal computer by an address bus and a control signal line, an IC card data port and a status port both connected to the personal computer by a data bus and connected to the serial-parallel converter, and a reader/writer control port connected to the personal computer by the data bus and connected to the control section. The access control section controls each of the ports, by an address and a read signal or a write signal supplied from the personal computer. Thus, in the IC card reader/writer for receiving and transmitting data between the personal computer and the IC card, processing speed is improved and control complexity is simplified.

5 Claims, 10 Drawing Sheets

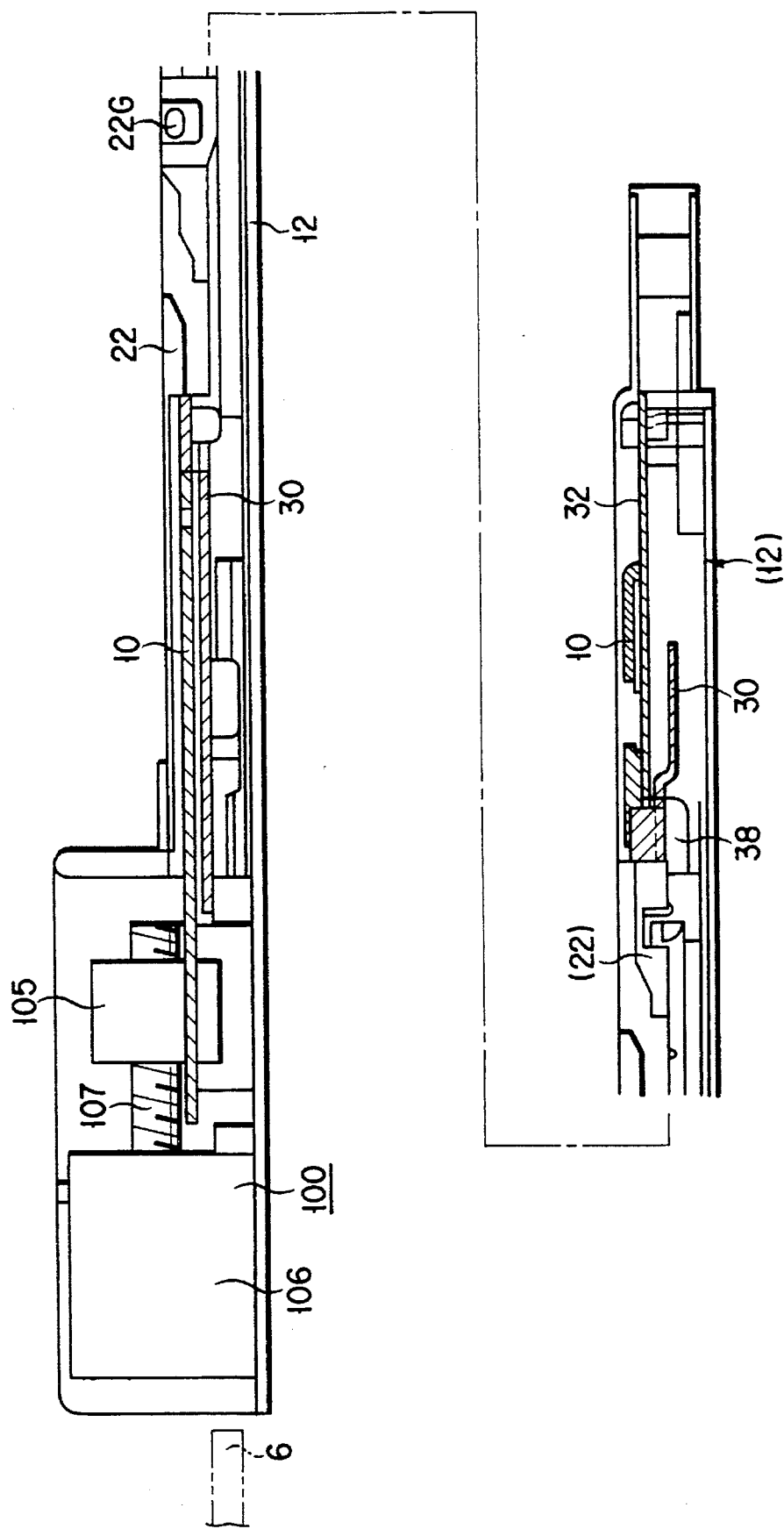
F I G. 4

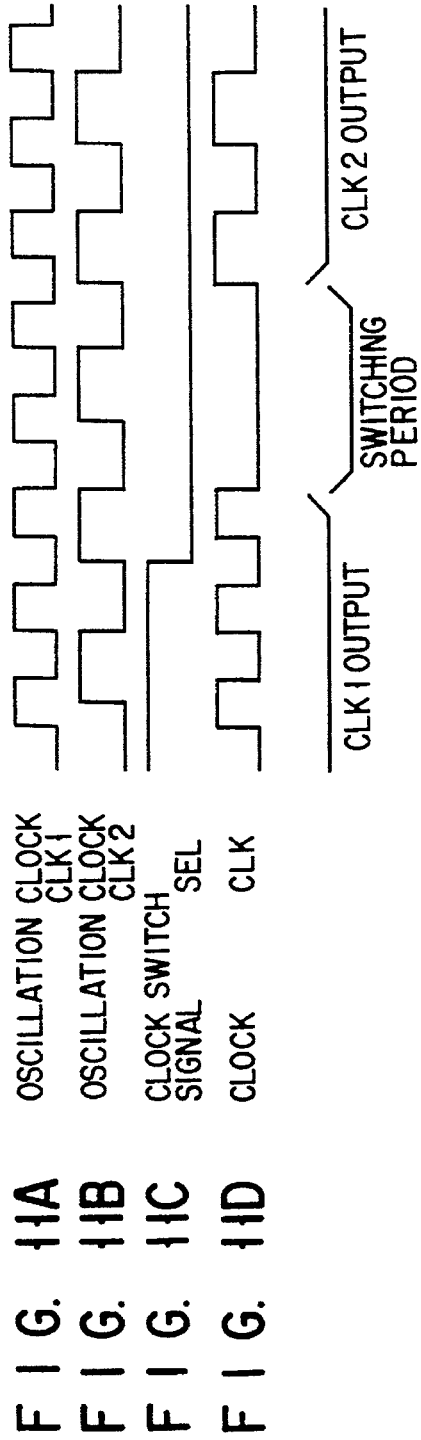
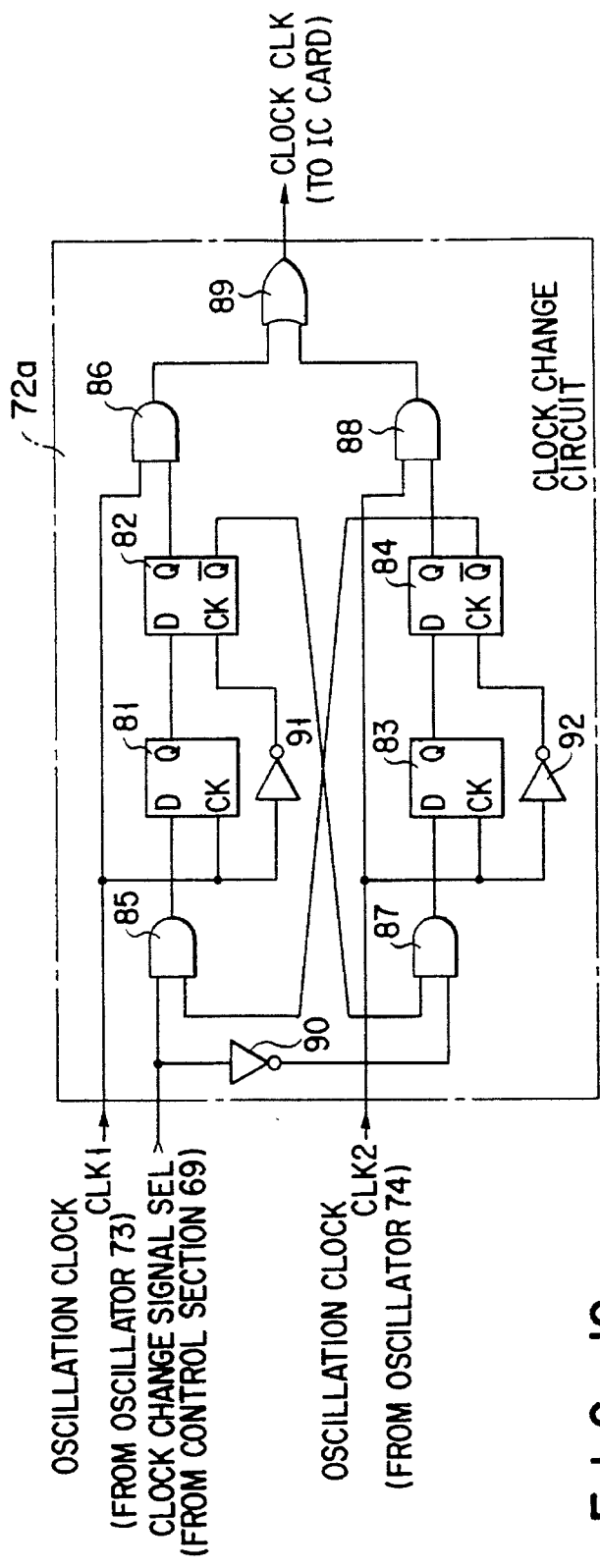
F I G. 12

IC CARD READER/WRITER

BACKGROUND OF THE INVENTION

1. Field of the Invention

The present invention relates to a data processor for reading data from an IC card writing data to the IC card, and more particularly to an IC card reader/writer connected to a computer equipment such as a personal computer.

2. Description of the Related Art

In a conventional IC card reader/writer, a serial communication interface is used to connect the reader/writer to computer equipment such as a personal computer used as a host apparatus.

In such a reader/writer, since the interface is serial, there is a disadvantage in that the speed of accessing the host apparatus from the reader/writer is low.

Also, conventionally, since the control of the reader/writer and the input/output of the IC card are to be distinguished therefrom by a protocol transmission, there is a disadvantage in that the control of the reader/writer is complicated.

Moreover, when the personal computer is used as a host apparatus, the serial line of the personal computer normally having only one channel is occupied by the IC card reader/writer.

Furthermore, the output of a telegram to be transmitted from the host apparatus to the IC card or the input of the telegram to be received is not performed regardless of time, which is needed to perform transmission or reception between the host apparatus and the IC card. Due to this, there is a disadvantage in that much time is required to perform communication between the host apparatus and the IC card.

SUMMARY OF THE INVENTION

An object of the present invention is to provide an IC card reader/writer wherein processing speed of data reception and transmission between a host apparatus and an IC card is improved and control complexity is simplified.

To achieve the above object, the present invention provides an IC card reader/writer including control means for controlling a power supply to a detachable IC card, an operation clock, a reset thereof, and receiving/transmitting means for receiving/transmitting serial data from/to the IC card, wherein a signal is received/transmitted between a host apparatus and the control means and data is received/transmitted between the host apparatus and the receiving/transmitting means, the IC card reader/writer comprising: serial-parallel converting means, connected to the receiving/transmitting means, for converting parallel data supplied from the host apparatus to serial data transmitted to the IC card, or for converting serial data supplied from the receiving/transmitting means to parallel data corresponding to the host apparatus; an IC card data port connected between a data bus of the host apparatus and the serial-parallel converting means; a status port connected between the data bus of the host apparatus and the serial-parallel converting means; a reader/writer control port connected between the data bus of the host apparatus and the control means; and access control means, connected by an address bus of the host apparatus and a control signal line, having a port selection address supplied from the host apparatus through the address bus, and at least one of read and write signals supplied from the host apparatus through a control signal line, for controlling each of the ports by these signals, the access control means for opening the port of the IC card data port to the side of the host apparatus so as to output data from the serial-parallel converting means to the host apparatus when the port selection address for the IC card data port is supplied to the access control means and the read signal is supplied thereto, the access control means for opening the port of the IC card data port to the side of the serial-parallel converting means so as to output data from the host apparatus to the serial-parallel converting means when the port selection address for the IC card data port is supplied to the access control means and the write signal is supplied thereto, the access control means for opening the port of the status port to the side of the host apparatus so as to output a status signal from the serial-parallel converting means to the host apparatus when the port selection address for the status port is supplied to the access control means and the read signal is supplied thereto, the access control means for opening the port for the reader/writer control port to the side of the host apparatus so as to output data from the serial-parallel converting means to the host apparatus when the port selection address for the reader/writer control port is supplied to the access control means and the read signal is supplied thereto, and the access control means for opening the port for the reader/writer control port to the side of the control means so as to output data from the host apparatus to the control means when the port selection address for the reader/writer control port is supplied to the access control means and the write signal is supplied thereto.

The present invention also provides an IC card reader/writer for receiving an IC card detachably from a host apparatus and inputting data from the host apparatus and outputting data to the host apparatus comprising: a connector connected to an address bus of the host apparatus and a data bus; a first I/O port, connected to the data bus of the host apparatus through the connector, for enabling data communication between the host apparatus and the IC card; a second I/O port, connected to the data bus of the host apparatus through the connector, for receiving an instruction for reading/writing from the host apparatus; and selecting means, connected to an address bus of the host apparatus through the connector, for selecting either the first port or second port based on an address signal received from the host apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4 is a side sectional view showing the inner structure of the IC card reader/writer;

FIGS. 11A to 11D are timing charts of the respective signals of a clock changing circuit;

FIG. 12 is a view of an electrical circuit showing the structure of a clock changing circuit.

DETAILED DESCRIPTION OF THE PREFERRED EMBODIMENT

One embodiment of the present invention will be explained with reference to the drawings.

Figure 1:
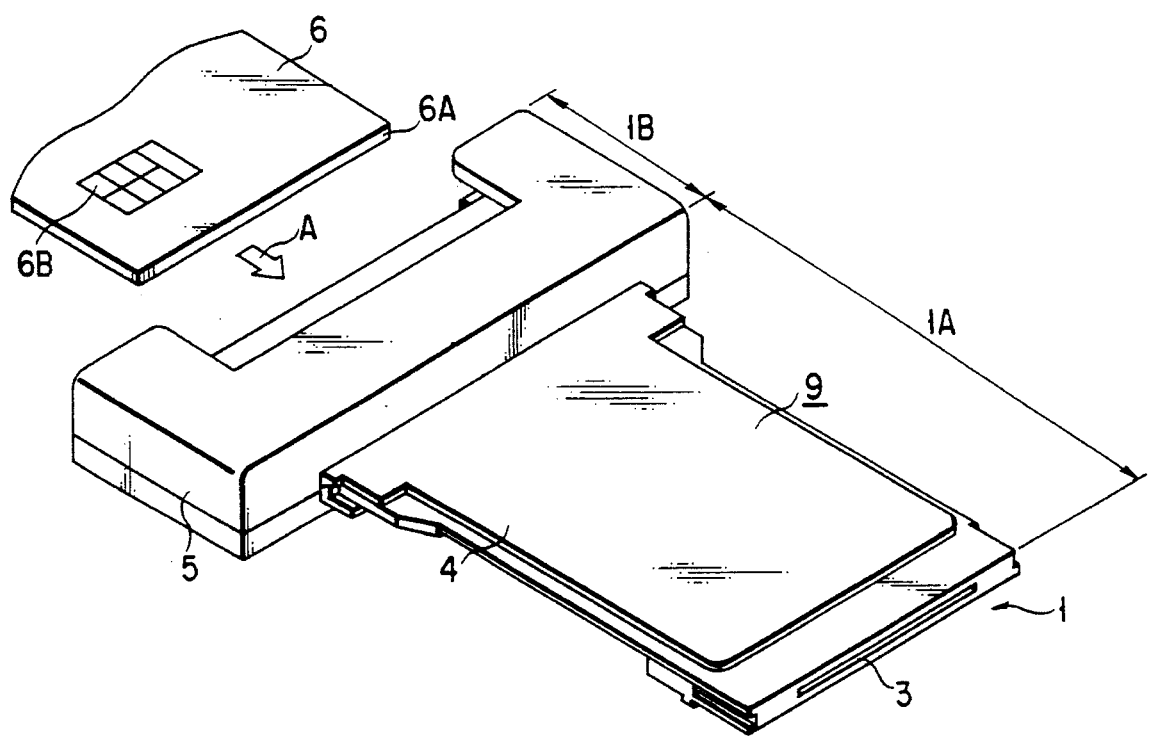
FIG. 1 is a perspective view showing an appearance of an IC card reader/writer.
Figure 2:
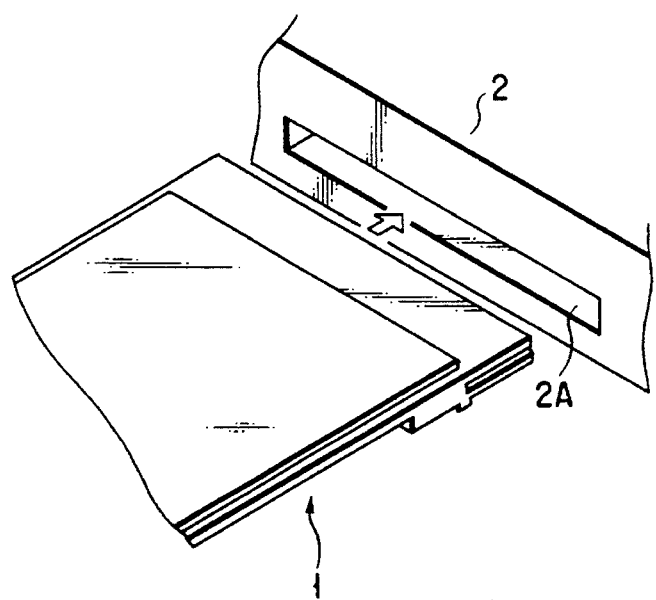
FIG. 2 is a perspective view showing a slot portion for a memory card of a notebook type personal computer to which the IC card reader/writer is inserted.

FIG. 1 shows an appearance of an IC card reader/writer 1, serving as an IC card data processor of the present invention. FIG. 2 shows a computer equipment 2 (host apparatus: personal computer) such as a notebook type personal computer having a slot 2A for a memory card to which the memory card (not shown) such as an extended memory is inserted.

The shape and size of the inside of the the slot 2A for the the memory card of the personal computer 2 are formed in accordance with the standards of the various types of memory cards. The IC card reader/writer 1 is inserted to the slot 2A for the memory card, so that a connector 3 provided at an end portion of the I/C card reader/writer 1 is electrically connected to a connector (now shown) of the personal computer 2.

Most of the shape and the size of the IC card reader/writer 1 are formed in accordance with the standard of the memory card, specifically a maximum size in thickness of 5 mm, and a size in width of 54 mm, which is substantially the same as an IC card 6. A portion 1A, which is built in the slot 2A, and a portion 1B, which is extended to the outside of the personal computer 2, are integrally formed. In this case, the portion 1B is a portion, which can be built in the slot 2A for the memory card of the personal computer 2, depending on the shape of the slot 2A.

Figure 3:
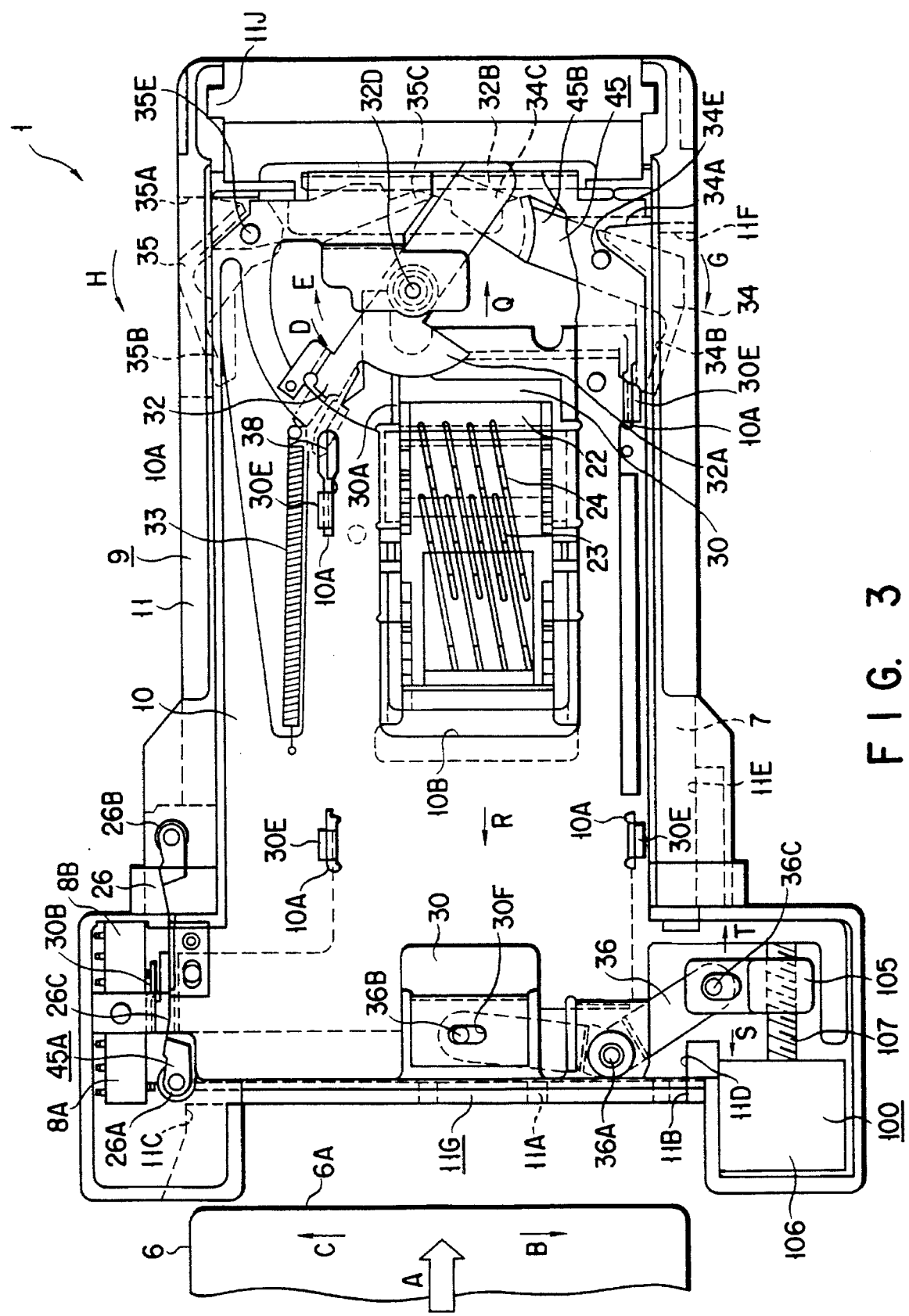
FIG. 3 is a plane view showing an inner structure of the IC card reader/writer.
Figure 5:
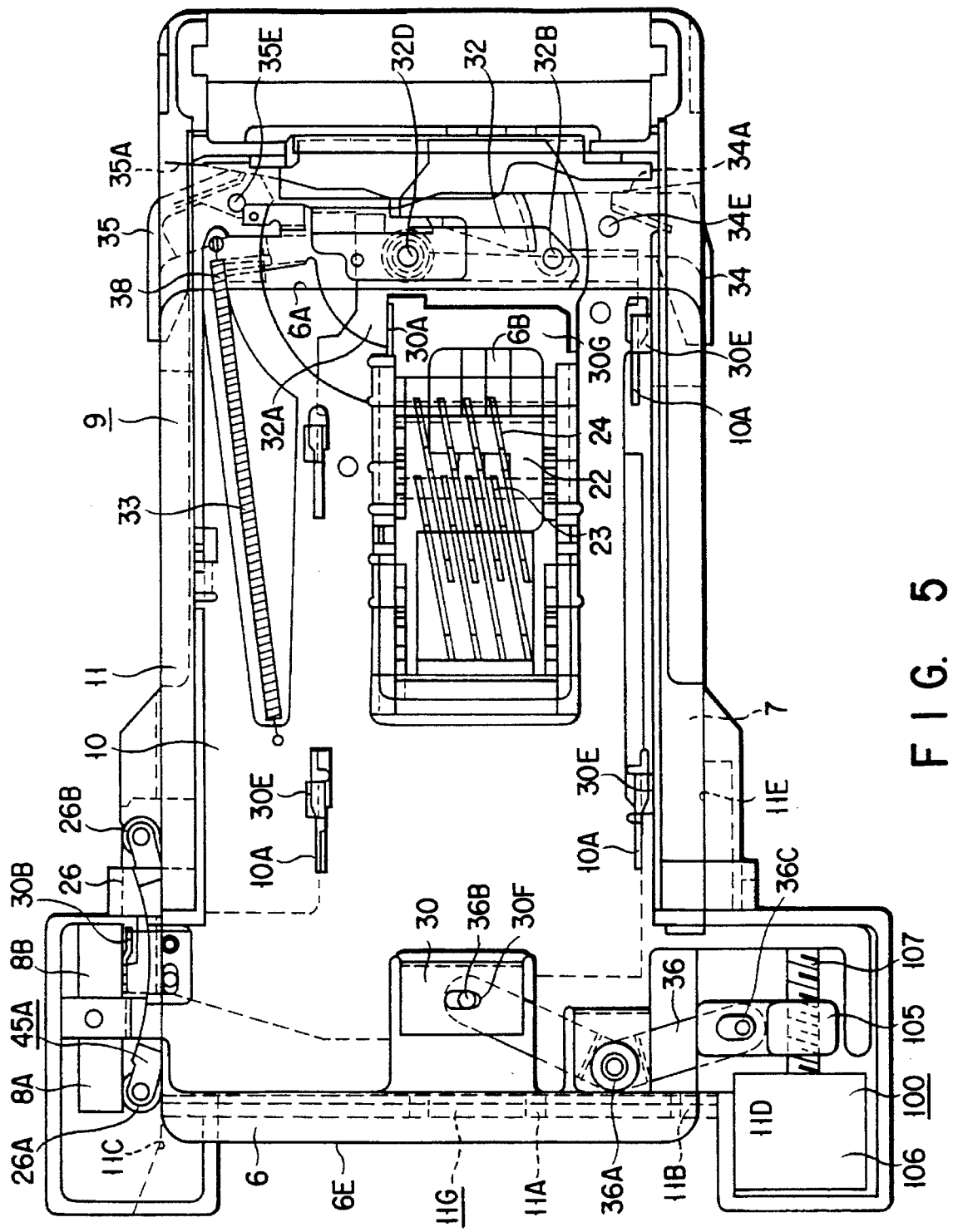
FIG. 5 is a plane view showing the inner structure of the IC card reader/writer.
Figure 6:
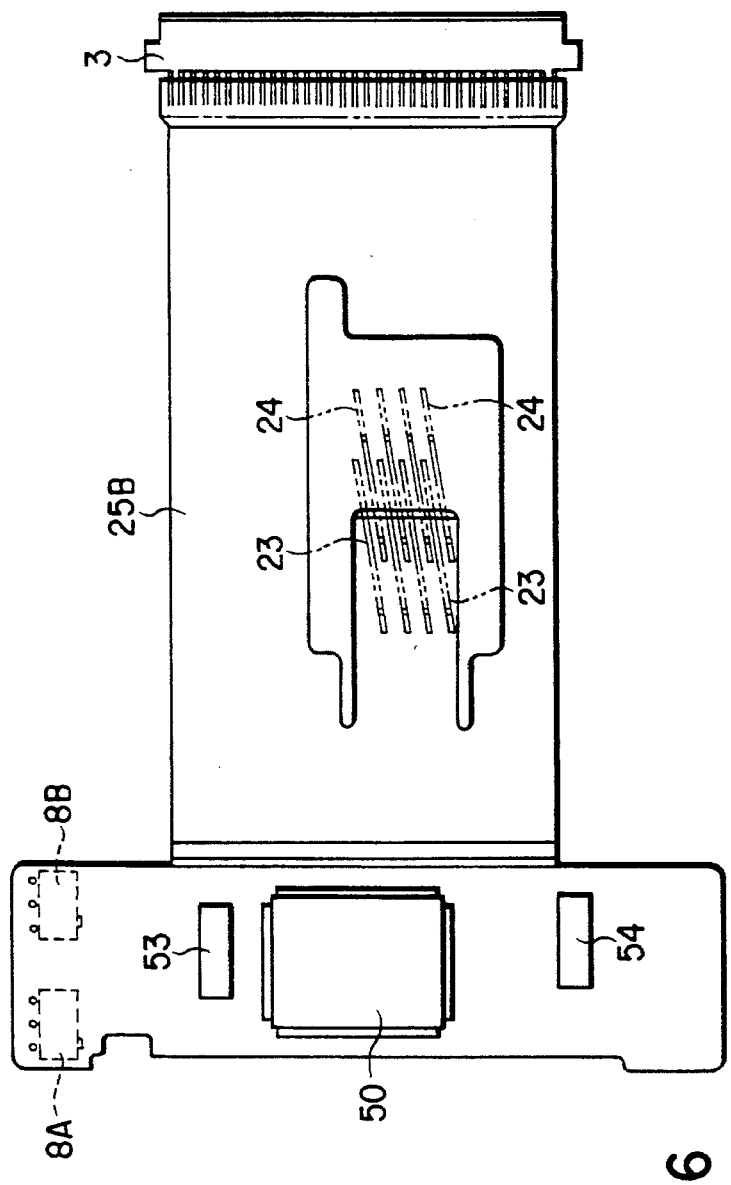
FIG. 6 is a plane view showing the structure of a flexible substrate on which a control circuit section of the IC card reader/writer and a connector are mounted.
Figure 7:
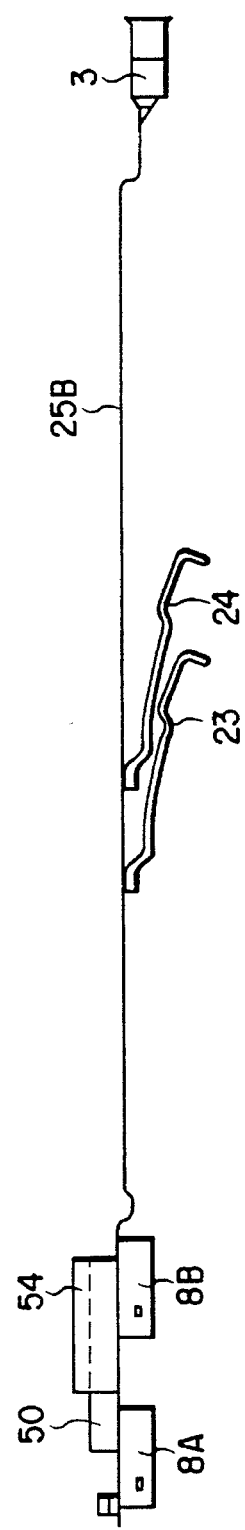
FIG. 7 is a cross sectional view showing the flexible substrate and the structure of each section.
Figure 8:
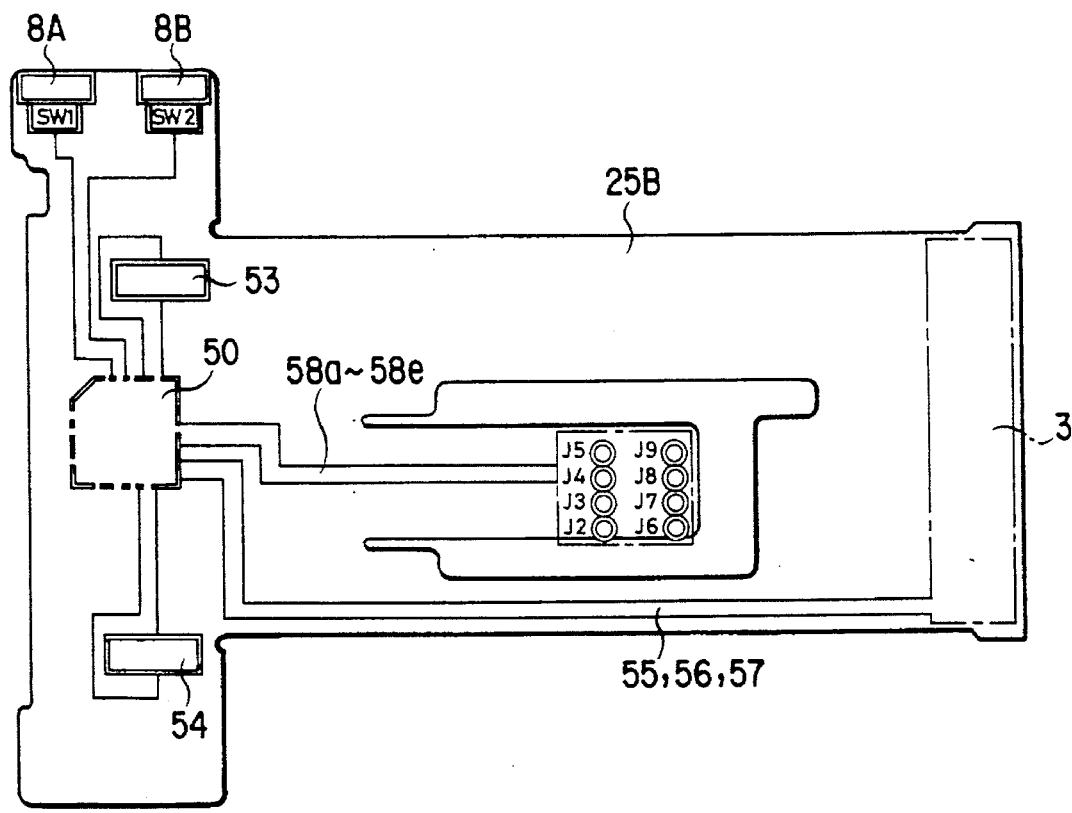
FIG. 8 is a plane view showing a state of connection of each section on the flexible substrate.

The inner structure of the IC card reader/writer will be explained with reference to FIGS. 3, 4, and 5. FIG. 3 shows a state in which a cover 4 (see FIG. 1) of the portion 1A built in the slot 2A, a cover 5 of the portion 1B extended to the outside of the slot 2A (see FIG. 1), and a flexible substrate 25B (see FIG. 8) for connecting a connector 3 to a control circuit section 50 to be described with reference to FIGS. 6 to 8 are removed, and an IC card 6 is not inserted. FIG. 5 shows a state in which the IC card 6 is inserted.

In other words, in FIGS. 3 to 5, a main body 9 of the apparatus comprises a main frame 10 for holding each mechanical member, and an outer rim 11 which the main frame 10 is fixed thereto and constitutes the outer shape. The shape and the size of the portion 1A built in the slot 2A of the outer rim 11, which is the structural member of the main body 9, are formed to be adjusted to the standard of the memory card to be used.

On the end surface of the portion 1B extended to the outside of the personal computer 2 of the outer rim 11, there is formed a card insertion inlet 11G having guide portions 11A, 11B, and 11C, serving as an insertion guide of the IC card 6. The card insertion inlet 11G is formed to have a predetermined opening size in which an inlet is wide and the opening becomes narrower toward an insertion direction (direction of an arrow A) of the IC card 6.

In the vicinity of the guide portion 11C of the card insertion inlet 11G, there is provided card moving means for moving guide rollers 26A and 26B right in an insertion direction of the IC card 6 by a guide roller spring 26C so as to be rotatably supported. The IC card 6 is pressed in a direction of arrow B, and collides with guide surfaces 11D and 11E formed at one side of an IC card insertion passage communicating with the card insertion inlet 11G, whereby the IC card 6 is positioned in the width direction in the vicinity of the card insertion inlet 11G. In other words, there is formed a first positioning mechanism 45A for positioning the width direction of a rear end 6E of the IC card 6.

In a lower surface side of the main frame 10, there is held a slider 30 to be movable to a first direction (direction of an arrow Q), which is along the IC card insertion passage 7 and the insertion direction of the IC card 6, and a second direction (direction of an arrow R), which is the discharging direction of the IC card 6, by engaging a plurality of slits 10A (four slits in this embodiment) formed in the main frame 10 with a plurality of claws 30E, respectively.

Moreover, at the right side close to the card insertion inlet 11G, that is, the right member toward the card insertion inlet 11G of the portion 1B extended to the outside of the personal computer 2, there is contained a slider moving mechanism 100, serving as slider moving means, whereby the slider 30 is moved to the first direction (direction of an arrow Q), which is the insertion direction of the IC card 6 and the second direction (direction of an arrow R), which is the discharging direction of the IC card 6.

In other words, in the slider 30, an elongate hole 30F is formed at a central portion of the width direction of the end portion positioned in the direction of the card insertion inlet 11G. On the other hand, in the main frame 10, a link 36 is held to be rotatable through a shaft 36A. A pin 36B, which is projected to one end of the link 36, is engaged with the elongated hole 30F.

Also, a nut member 105 is connected to the other end of the link 36 through a pin 36C. The nut member 105 is screwed into a screw 107, which is integrally formed with a shaft of a motor 106, serving as a driving source. The nut member 105 can be reciprocated in directions of an arrow S and an arrow T, which are parallel to the moving direction of the slider 30 by the positive and reverse rotations of the motor 106.

The nut member 105 is moved in the direction of an arrow S by the positive rotation of the motor 106, whereby the slider 30, which is connected to the link 36, is moved to the first direction (direction of arrow Q), which is the inserting direction of the IC card 6. Also, the nut member 105 is moved in the direction of an arrow T by the reverse rotation of the motor 106, whereby the slider 30, which is connected to the link 36, is moved to the second direction (direction of arrow R), which is the discharging direction of the IC card 6.

Moreover, at the central portion of the slider 30, an opening portion 30G, which corresponds to an opening portion 10B formed in the main frame 10, is formed, and a contact holder 22 to be described later is inserted into the opening portion 30G.

Figure 9:
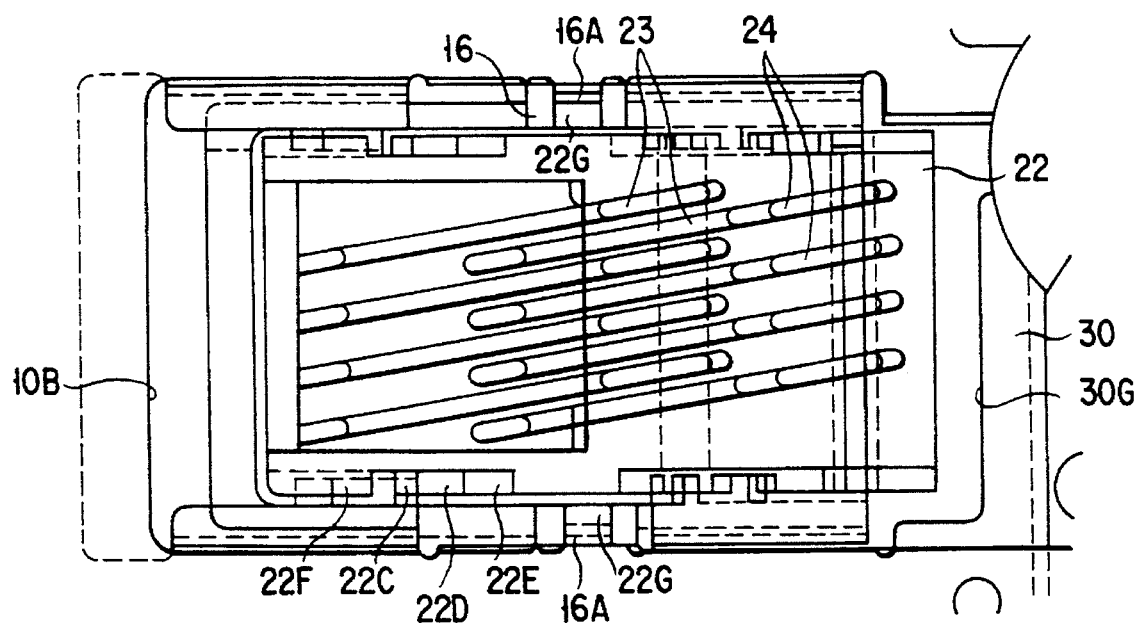
FIG. 9 is a partially enlarged view of FIG. 5.

As shown in FIG. 9, the contact holder 22 can be moved only in up and down directions by engaging projections 22G, 22G, which are formed at the central portion of both end surfaces, with slide grooves 16A, 16A, which are formed at the end surface portions of both sides of a contact guard 16 fixed to the opening portion 10B of the main frame 10.

Also, as shown in FIGS. 3 to 5, in the innermost direction of the IC card insertion passage 7, there is provided a lever 32 as a moving member. The lever 32 prohibits the movement of the slider 30 until the the IC card 6 is inserted to a predetermined position, and releases the fixture of the slider 30 at the time when the IC card 6 is inserted to the predetermined position. Then, the movement of the direction where the IC card 6 is pressed back is restricted by the slider 30 moved in accordance with the release.

In other words, the lever 32 is used as the moving member, which is driven to be movable through a shaft 32D projected to the main frame 10, and to be moved counterclockwise (direction of an arrow D of FIG. 3) by a spring 33.

On one end portion of the lever 32, a card contacting section 38, which is formed of a member having self-lubricity, is formed, to be brought in contact with the end surface of the inserted IC card 6. The card contact section 38 is pressed along the pressing movement of the IC card 6, whereby the lever 32 is rotated clockwise (direction of an arrow E of FIG. 3).

Also, in the lever 32, a sector shape portion 32A, serving as a stopper portion, is formed, The sectorial portion 32A contacts a cut portion 30A of the slider 30 to hold the slider 30 not to be moved right in FIG. 3. When the lever 32 rotates clockwise (direction of arrow E) and reaches a predetermined position, the sector shape is discontinued, and changed to a shape in which the slider 30 can be moved in a right direction of the figure (direction of arrow Q).

In a portion, which is close to the position where the lever 32 is provided, and which is a reference side of positioning the IC card 6, there is provided a first guide member 34, which is sandwiched between the main frame 10 and a base frame 12 (see FIG. 4), and which is held to be rotatable around a shaft 34E. The first guide member 34 is moved clockwise (direction of an arrow G) by a spring 34A, and contained in the inside of the outer rim 11 in a normal state.

Moreover, in the first guide member 34, there are formed a portion 34C, which comes in contact with a projection 32B formed in the lever 32, and abutting surface 34B to which a top end 6A of the IC card 6 is inserted when the IC card 6 reaches a predetermined position.

In a portion, which is close to the position where the lever 32 is provided, and which is a reference side of positioning the IC card 6, there is provided a second guide member 35, which is sandwiched between the main frame 10 and the base frame 12, and which is held to be rotatable around a shaft 35E. The second guide member 35 is moved counterclockwise (direction of an arrow H) by a spring 35A, and contained in the inside of the outer rim 11 in a normal state.

Also, in the second guide member 35, there are formed a portion 35C, which comes in contact with the first guide member 34, and abutting surface 35B to which a top end 6A of the IC card 6 is inserted. Then, similar to the first guide member 34, the second guide member 35 is contained in the inside of the outer rim 11 in a normal state.

The spring 35A, which moves the second guide member 35 to the direction of arrow H, is set to be stronger than the spring 34A, which moves the first guide member 34 to the direction of arrow G.

Moreover, the first guide member 34, which is provided at the positioning reference side and which is rotated when the IC card 6 reaches the predetermined position, abuts an abutting portion 11F, serving as stopping means of the outer rim 11, not be rotated further in the direction of arrow G.

On the other hand, in the second guide member 35, a portion corresponding to the abutting portion 11F is not provided, and play is formed. Whereby, the position of the width direction of the top end is determined by the first guide member 34 of the reference side when the IC card 6 reaches the predetermined position.

In other words, there is formed a second positioning mechanism 45B for positioning the width direction of a top end side of the IC card 6.

As mentioned above, there are provided positioning means 45 comprising the first and second positioning mechanisms 45A and 45B for positioning the width direction of the IC card 6 when the IC card is inserted to the predetermined position.

As shown in FIG. 3, at the left side close to the card insertion inlet 11G, that is, the left member toward the card insertion inlet 11G of the portion 1B extended to the outside of the personal computer 2, there are provided a microswitch 8A and a micro switch 8B in a state such that they are fixed to the outer rim 11. The microswitch 8A is used as means for IC card insertion detecting means for detecting that the IC card 6 is inserted to the IC card insertion inlet 7. The microswitch 8B is used as IC card mount completion detecting means for detecting whether or not the slider 30 is placed at the position where the contact holder 22 is depressed in order to bring contacts 23 and 24 into contact with a contact portion 6B as a contact point of the IC card 6.

Then, when the top end 6A of the IC card 6 is inserted to the card insertion inlet 11G and the guide roller 26A is moved to the direction of the arrow C, the microswitch 8A is turned on by the roller 26A.

Also, when the IC card 6A is inserted to the predetermined position, the motor 106 of slider moving mechanism 100 is positively rotated and the nut member 105 is moved to the direction of an arrow S of FIG. 3. Whereby, the slider 30, which is connected to the nut member 105 through the link 36, is moved to the first direction (direction of arrow Q), which is the insertion direction of the IC card 6. When the slider 30 is moved to the direction of arrow Q, the microswitch 8B is turned on by a cut portion 30B having an inclined portion, which is projected to the slider 30, and which comes near the microswitch 8B as advancing right.

The following will explain the structure of the contact holder 22 with reference to FIG. 9.

A crank-shaped projection (not shown) of the slider 30 and a guide groove (not shown) are formed on the side surface of contact holder 22. In the guide groove, there are formed cam surfaces 22C, 22D, 22E, and 22F. The crank-shaped projection contacts these cam surfaces so that the cam surfaces are moved. Moreover, projections 22G, are formed at both sides of the contact holder 22. The contact holder 22 is movably held in only up and down directions by slide grooves 16A, 16A formed in the contact guard 16 fixed to the main frame 10.

Under this state, if the slider 30 is moved to the insertion direction of the IC card 6, the lower surface of the crank-shaped projection is moved together with the cam surfaces 22C, 22D, 22E, thereby pressing the contact holder 22 downward. Then, if the slider is returned, the upper surface of the crank-shaped projection presses the contact holder 22 upward through the cam surface 22F.

As shown in FIGS. 6 to 8, there are provided the control circuit section 50, the microswitches 8A and 8B, the vibrators 53 and 54, and the connector 3 on the flexible substrate 25B.

Moreover, as shown in FIGS. 6 to 8, the contacts 23 and 24 are electrically connected to the control circuit section 50 by an I/O signal line 58a, a reset signal line 58b, a power supply line 58c, a clock signal line 58d, and a ground line 58e. Furthermore, the control circuit section 50 is electrically connected to the connector 3 by an address bus line 55 of the flexible substrate 25B, a data bus line 57, and a control signal line 56. Connector 3 is a standardized connector for a memory card, whereby connector 3 can be connected to a connector (not shown) of the personal computer by use of the slot 2A of various types of personal computers 2.

The connector 3 is inserted to an insertion portion 11J (see FIG. 3), which is formed at the top end portion of the outer rim 11, and the flexible substrate 25B and the control circuit section 50 are fixed to the main frame 10, respectively.

Figure 10:
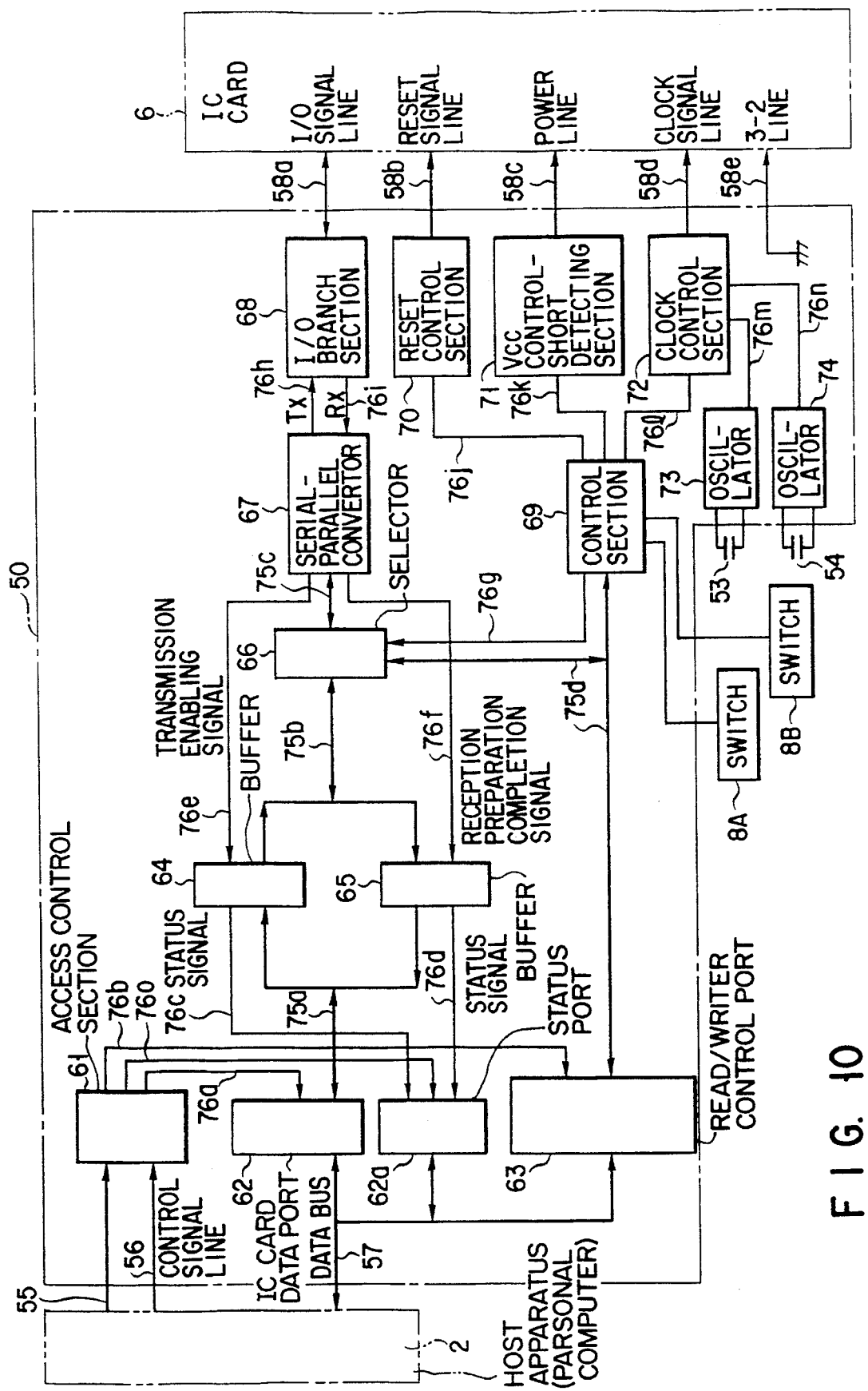
FIG. 10 is a block diagram showing the structure of the control circuit section of the IC card reader/writer of one embodiment of the present invention.

The structure of the control circuit section 50 will be explained with reference to the block diagram of FIG. 10 as follows:

The control circuit section 50 comprises an access control section 61, an IC card data port 62, a status port 62a, a reader/writer control port 63, buffers 64, 65, a selector 66, a serial-parallel converter 67, an I/O branch section 68, a control section 69, a reset control section 70, a VCC control-short detecting section 71, a clock control section 72, and oscillators 73 and 74.

The control circuit section 50 is formed of one LSI (large scale integrated circuit) comprising the above-mentioned parts.

The address bus 55 and the control signal line 56 are connected to the access control section 61, respectively, and the the access control section 61 is connected to the personal computer 2 through the connector 3.

The access control section 61 generates an internal control signal based on a port selection address, which is supplied from the personal computer 2 through the address bus 55, a read signal or a write signal, which is supplied from the personal computer 2 through the control signal line 56. Then, the access control section 61 outputs the generated internal control signal to the IC card data port 62 through a signal line 76a or the status port 62a through a signal line 76o, or the reader/writer control port 63 through a signal line 76b.

In other words, when the port selection address for the IC card data port 62 is supplied to the access control section 61 by the address bus 55 and the read signal is supplied from the control signal line 56 thereto, the port of the IC card port 62 is opened to the side of the personal computer 2, and data sent from a data bus 75a is outputted to the data bus 57. Whereby, data sent from the buffer 65 can be outputted to the personal computer 2.

Also, when the port selection address for the IC card data port 62 is supplied to the access control section 61 by the address bus 55 and the write signal is supplied from the control signal line 56 thereto, the port of the IC card port 62 is opened to the side of the buffer 64, and data sent from the data bus 57 is outputted to the data bus 75a. whereby, data sent from the personal computer 2 can be outputted to the buffer 64.

Moreover, when the port selection address for the status port 62a is supplied to the access control section 61 by the address bus 55 and the read signal is supplied from the control signal line 56 thereto, the port of the status port 62a is opened to the side of the personal computer 2, and a status signal sent from a signal line 76c or 76d is outputted to the data bus 57. Whereby, the status signal sent from the buffer 64 or the buffer 65 can be outputted to the personal computer 2.

Moreover, when the port selection address for the reader/writer control port 63 is supplied to the access control section 61 by the address bus 55 and the read signal is supplied from the control signal line 56 thereto, the port of the reader/writer control port 63 is opened to the side of the personal computer 2, and data sent from a data bus 75d is outputted to the data bus 57. Whereby, data sent from the control section 69 can be outputted to the personal computer 2.

Furthermore, when the port selection address for the reader/writer control port 63 is supplied to the access control section 61 by the address bus 55 and the write signal is supplied from the control signal line 56 thereto, the port of the reader/writer control port 63 is opened to the side of the control section 69, and data sent from a data bus 57 is outputted to the data bus 75d, whereby, data sent from the personal computer 2 can be outputted to the control section 69.

The IC card data port 62 is connected to the data bus 57, and also connected to the personal computer 2 through the connector 3.

The IC card data port 62 opens or closes the port in accordance with the internal control signal sent from the access control section 61. While the port is opened, the data bus 57 and the data bus 75a are connected to each other, and data, which is supplied from the personal computer 2 through the data bus 57, is outputted to the buffer 64 through the data bus 75a. Or, data, which is supplied from the buffer 65 through the data bus 75a, is outputted to the personal computer through the personal computer 2.

The status port 62a opens or closes the port in accordance with the internal control signal sent from the access control section 61. While the port is opened, a storage data vacancy signal, which serves as the status signal supplied from the buffer 64 through the signal line 76c, is outputted to the personal computer 2 through the data bus 57. Or, a storage data presence signal, which serves as the status signal supplied from the buffer 65 through the signal line 76d, is outputted to the personal computer 2 through the data bus 57, whereby the personal computer 2 outputs transmission data, which is sent to the IC card, to the control circuit section 50 in accordance with the vacancy state of the buffer 64. The personal computer 2 inputs receiving data, which is sent from the IC card, from the control circuit section 50 in accordance with the data storage state to the buffer 65.

The reader/writer control port 63 opens or closes the port in accordance with the internal control signal sent from the access control section 61. While the port is opened, the data bus 57 and the data bus 75d are connected to each other, and data receiving and transmitting between the personal computer 2 and the control section 69 is performed.

Each of the buffers 64 and 65 is a first-in first-out memory having enough capacity to store transmitted and received telegraphic messages of IC card 6. Each of the buffers 64 and 65 comprise a first-in first-out RAM.

The buffer 64 is an input buffer memory, and outputs data of one byte unit to the serial-parallel converter 67 through the data bus 75b, the selector 66, and the data bus 75c in accordance with a transmission enabling signal, which is supplied from the serial-parallel converter 67 through the signal line 76e.

The buffer 65 is an output buffer memory, and sequentially stores data of one byte unit, which is supplied from the serial-parallel converter 67 through the data bus 75c, the selector 66, and the data bus 75b, in accordance with a receiving preparing completion signal, which is supplied through the signal line 76f.

The selector 66 is used to change the operation such that the data buses 75c and 75d are connected to each other and data transfer between the control section 69 and the serial-parallel converter 67 can be performed based on a select signal supplied from the control section 69 through a signal line 76g. Or, the selector 66 is used to change the operation such that the data buses 75b and 75c are connected to each other and data transfer between the control section 69 and the buffer 65 can be performed based on a select signal supplied from the control section 69 through a signal line 76g. Or, the selector 66 is used to change the operation such that the data buses 75b and 75c are connected to each other and data transfer among the serial-parallel converter 67 and the buffers 64 and 65 can be performed based on a select signal supplied from the control section 69 through a signal line 76g.

The serial-parallel converter 67 converts parallel data of one byte unit, which is supplied from the buffer 64 through the data bus 75b, the selector 66, and the data bus 75c, to serial data (Tx) for output, and outputs serial data to the I/O branch section 68 through a signal line 76h. Or, the serial-parallel converter 67 converts serial data (Rx) for input, which is supplied from the I/O branch section 68 through a signal line 76i, to parallel data of one byte, and outputs parallel data to the buffer 65 through the data bus 75c, the selector 66, and the data bus 75b, or the control section 69 through the data bus 75c, the selector 66, and the data bus 75d.

The serial-parallel converter 67 outputs the transmission enabling signal from the signal line 76e every time when data of one byte unit is outputted to the I/O branch section 68 from the buffer 64. Also, the serial-parallel converter 67 outputs the receiving preparation completion signal from the signal line 76f every time when data of one byte unit is outputted to the buffer 65 from the I/O branch section 68.

The I/O branch section 68 outputs data, which is supplied from the serial-parallel converter 67 through the signal line 76h, to the IC card 6 through the I/O signal line 58a and the contact 23 (24). Or, the I/O branch section 68 outputs data, which is supplied from the IC card 6 through the contact 23 (24) and the I/O signal line 58a, to the serial-parallel converter 67 through the signal line 76i.

The control section 69 performs various types of controls in accordance with control data, which is supplied from the personal computer 2 through the data bus 57, the reader/writer control port 63, and the data bus 75d for controller.

The control section 69 detects a short-circuit by a detection signal, which is supplied from the VCC control-short detecting section 71 through a signal line 76k, and outputs the result to the personal computer 2.

The control section 69 detects whether or not an error is generated by response data (answer to reset) from the IC card 6. If the error is generated, the control section 69 outputs an error signal to the personal computer 2. If the error is not generated, the control section 69 outputs response data to the personal computer 2 from the IC card 6.

The control section 69 outputs a select signal to the selector 66 through the signal line 76g, and a reset signal to the reset control section 70 through the signal line 76j. Moreover, the control section 69 outputs a power-on signal and a power-off signal to the VCC control-short detecting section 71 through the signal line 76k, and a clock-on/off signal and a clock change signal to the clock control section 72 through a signal line 76l.

Also, the microswitches 8A and 8B are connected to the control section 69.

Whereby, the control section 69 can determine the insertion state of the IC card 6 by the detection signal sent from the microswitches 8A and 8B.

The reset control section 70 outputs the reset signal, which is supplied from the control section 69 through the signal line 76j, to the IC card 6 through the reset signal line 58b and the contact 23 (24).

The VCC control-short detecting section 71 supplies a power voltage Vcc to the IC card 6 through the power-supply line 58c and the contact 23 (24) in accordance with the power-on signal supplied from the control section 69 through the signal line 76k. Also, the VCC control-short detecting section 71 stops the supply of the power voltage Vcc in accordance with the power-on signal supplied from the control section 69 through the signal line 76k.

The clock control section 72 has a clock change circuit 72a.

The clock control section 72 selectively outputs a clock CLK (see FIG. 11D, left side) having a predetermined frequency, which is based on an oscillation clock CLK1 (see FIG. 11A) supplied from an oscillator 73 through a signal line 76m, and a clock CLK (see FIG. 11D, right side) having a predetermined frequency, which is based on an oscillation clock CLK2 (see FIG. 11B) supplied from an oscillator 74 through a signal line 76n, to the IC card 6 through the clock signal line 58d and the contact 23 (24) in accordance with the clock change signal (see FIG. 11C) supplied from the control section 69 through the signal line 76l.

The oscillator 73, to which the vibrator 53 is connected, outputs the oscillation clock CLK1 of the first frequency, which is prepared by dividing the signal sent from the vibrator 53, to the clock change circuit 72a. The oscillator 74, to which the vibrator 54 is connected, outputs the oscillation clock CLK2 (CLK1>CKL2) of the second frequency, which is prepared by dividing the signal sent from the vibrator 54, to the clock change circuit 72a.

Also, a ground section (not shown) is connected to the IC card 6 through a ground line 58e and the contact 23(24) such that the IC card 6 is grounded.

As shown in FIG. 12, the clock change circuit 72a comprises D-type flip-flop circuits (FF circuits) 81, 82, 83, and 84, AND circuits 85, 86, 87, and 88, an OR circuit 89, and inverter circuits 90, 91, and 92.

For example, the clock change signal sent from the control section 69 is set to be "H" level, a gate of the AND circuit 86 is opened by a set output of the FF circuit 82. The oscillation clock CLK1 sent from the oscillator 73 is outputted through the AND circuit 86 and the OR circuit 89 as a clock CLK sent from the clock change circuit 72a.

Under this state, if the clock change signal sent from the control section 69 is set to "L" level, a gate of the AND circuit 85 is closed, so that the FF circuits 81 and 82 are sequentially reset by the oscillation clock CLK1 sent from the oscillator 73. At the time of two clocks, the gate of the AND circuit 86 is closed, the oscillation clock CLK1 sent from the oscillator 73 is not supplied to the OR circuit 89.

Also, if the clock change signal sent from the control section 69 is set to "L" level, the gate of the AND circuit 86 is opened, and a reset output of the FF circuit 82 is supplied to the FF circuit 83. Whereby, the FF circuit 83 is set by the oscillation clock CLK2 sent from the next oscillator 74. Moreover, the FF circuit 84 is set by the oscillation clock CLK2 sent from the next oscillator 74, so that the gate of the AND circuit 88 is opened by the set output of the FF circuit 84.

As a result, the oscillation clock CLK2 sent from the oscillator 74 is outputted through the AND circuit 88 and the OR circuit 89 as a clock CLK sent from the clock change circuit 72a.

In a case that the oscillation clock CLK2 is changed to the oscillation clock CLK2, the similar operation is performed.

The clock CLK outputted from the OR circuit 89 of the clock change circuit 72a is not directly supplied to the IC card 6 but outputted through a clock stop circuit (not shown) and an output buffer.

According to the clock change circuit 72a, the clock change signal is synchronized with the clock to be outputted, and a new oscillation clock (CLK2) is supplied after the output of the oscillation clock CLK1, which is presently supplied, is stopped. Due to this, there is no noise generated at the time the clock is changed.

Figure 13:
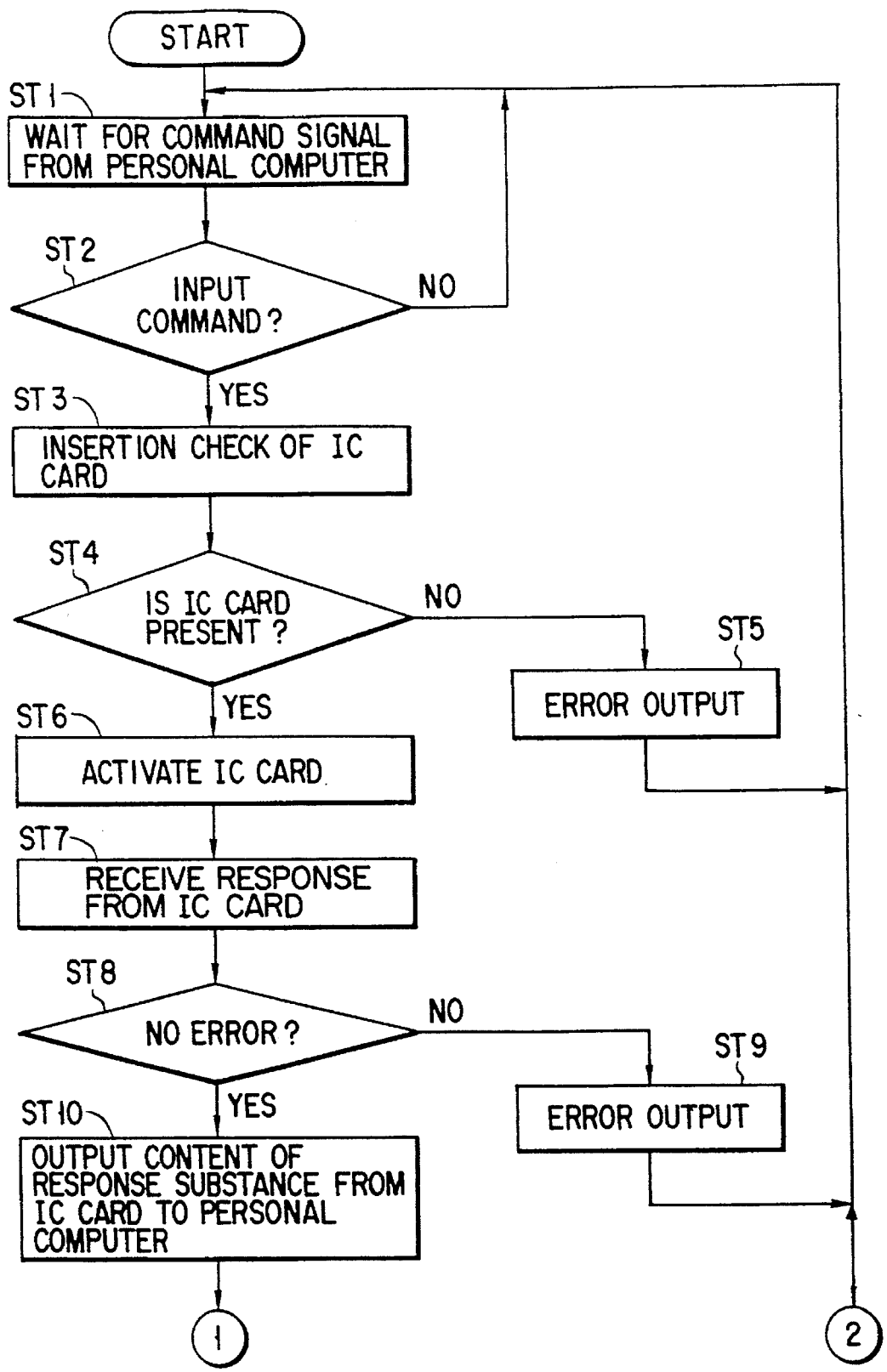
FIGS. 13 and 14 are flow charts for explaining the operation of the IC card reader/writer.
Figure 14:
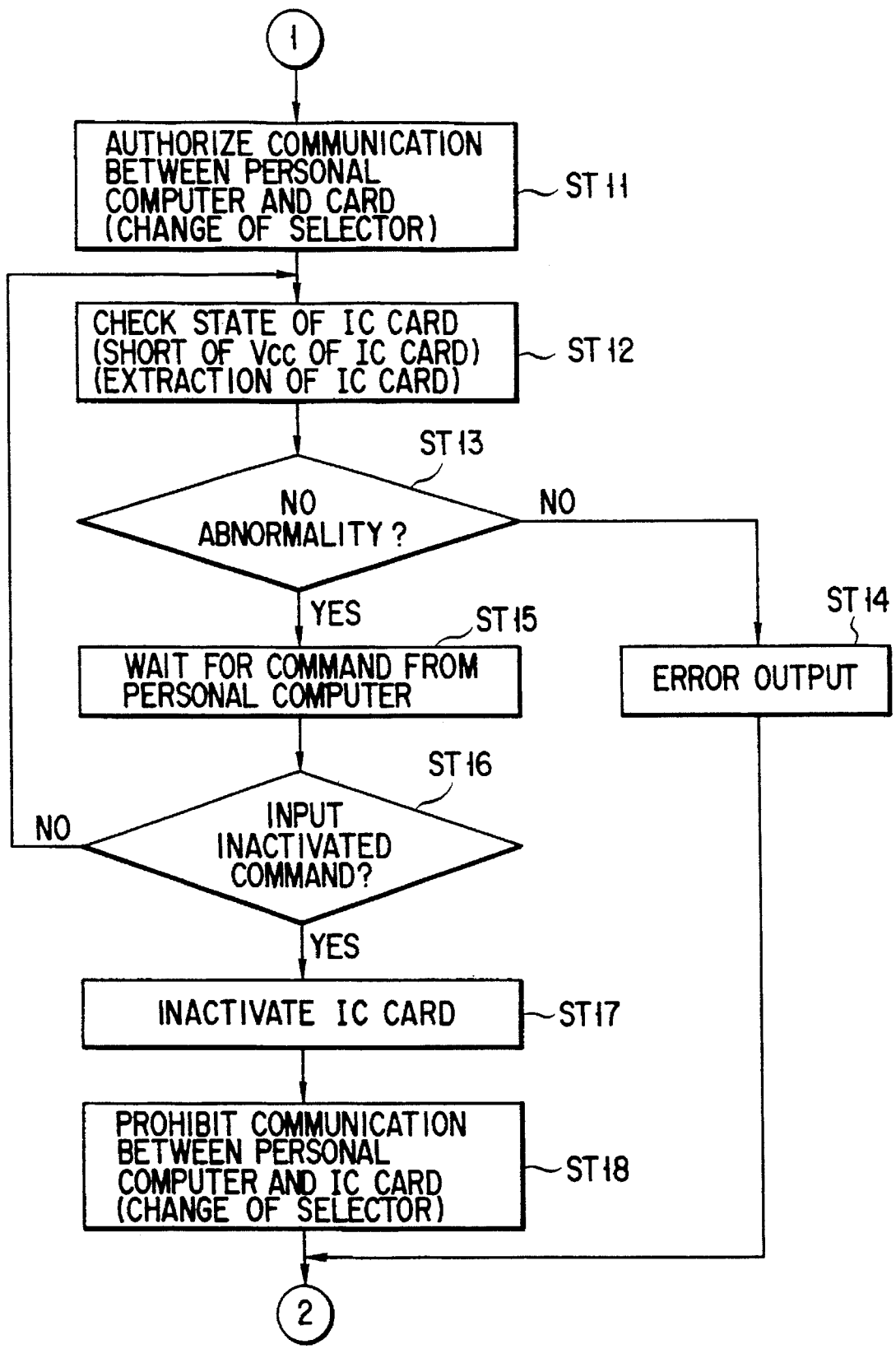

In the above-mentioned structure, the following will explain the operation of the control circuit section 50 with reference to the flow chart shown in FIGS. 13 and 14.

First of all, in a standby state of receiving a command from the personal computer 2 (ST1), the address for the reader/writer control port 63 is supplied to the access control section 61 from the personal computer through the address bus 55, and a write signal is supplied thereto through the control signal line 56. As a result, the access control section 61 opens the port of the reader/writer control port 63 to the side of the control section 69, data from the data bus 57 is outputted to the data bus 75d. Thereby, data (activate command) is outputted to the control section 69 from the personal computer 2.

Then, the activate command outputted from the personal computer 2 is supplied to the control section 69 through the data bus 57, the reader/writer control port 63, and the data bus 75d. If the control section 69 detects the reception of the activate command (ST2), the insertion of the IC card 6 is checked by detection signals sent from the microswitches 8A and 8B (ST3). If it is detected that the IC card 6 is not inserted (ST4), the control section 69 recognizes the state as an error, and outputs an error signal to the personal computer 2 (ST5).

The error signal may be outputted to the personal computer 2 through the data bus 75d, the reader/writer control port 63, and the data bus 57. Or, the error signal may be outputted to the personal computer 2 through the data bus 75d, the selector 66, the data bus 75b, the buffer 65, the data bus 75a, the IC data port 62, and the data bus 57. Or, the type of the error and the content of the error may be outputted through the above two routes.

In the case that it is detected that the IC card 6 is inserted (ST4) by the check in ST3, the control section 69 detects that the IC card 6 is activated, and outputs the power-on signals to the VCC control-short detecting section 71, sequentially.

Moreover, the control section 69 outputs the clock-on signal to the clock control section 72, and outputs a reset release signal to the reset control section 70 (ST6).

Whereby, the VCC control-short detecting section 71 supplies the power voltage Vcc to the IC card 6, and the clock control section 72 supplies the clock CLK to the IC card 6 from the clock switch circuit 72a. The reset control section 70 releases the output of the reset signal to the IC card 6.

Also, the control section 69 outputs the change signal, which corresponds to the reception of response data, to the selector 66. Whereby, the selector 66 connects the data bus 75c to the data bus 75d.

Due to this, response data sent from the IC card 6 is supplied to the control section 69 through the contact 23(24), the I/O signal line 58a, the I/O branch section 68, the signal line 76i, the data bus 75c, the selector 66, and the data bus 75d. The control section 69 receives response data from the IC card 6 (ST7), and determines whether or not an error is generated based on the received response data (ST8). Then, if it is determined that the error is generated, the control section 69 outputs the error signal to the personal computer 2 (ST9).

As a result of the determination in ST8, if the error is not generated, the control section 69 outputs the change signal, which corresponds to the transmission of response data, to the selector 66. Whereby, the selector 66 connects the data bus 75d and 75b, and outputs data, which is sent from the control section 69, to the buffer 65.

Due this, response data of the IC card sent from the control section 69 is supplied to the buffer 65 through the data bus 75d, the selector 66, and the data bus 75b. If data is stored in the buffer 65, store storage data presence signal, which serves as the status signal showing that data is stored, is outputted to the status port 62a through the signal line 76d.

Under this state, the address for the the status port 62a is supplied to the access control section 61 from the personal computer 2 through the address bus 55, and a read signal is supplied thereto through the control signal line 56. As a result, the access control section 61 opens the port of the status control port 62a to the side of the personal computer 2, the status signal from the signal line 76c or 76d is outputted to the personal computer 2 through the data bus 57 (ST10).

In this case, if the storage data presence signal is supplied to the personal computer 2 from the buffer 65, the personal computer 2 outputs the address for the IC card data port 62 to the the access control section 61 through the address bus 55, and outputs the read signal to the access control section 61 through the control signal line 56.

As a result, the access control section 61 opens the port of the IC card data port 62 to the side of the personal computer 2, and outputs data, which is sent from the data bus 75a, to the data bus 57. Whereby, response data, which is sent from the IC card 6 of the buffer 65, is outputted to the personal computer 2.

Also, the control section 69 outputs the change signal, which corresponds to the authorization of the communication between the personal computer 2 and the IC card 6, to the selector 66, so that the selector 66 connects the data bus 75b to the data bus 75c. As a result, data communication between the personal computer 2 and the IC card 6 is authorized (ST11).

Under this state, when transmission data sent from the personal computer 2 is outputted to the IC card 6, the address for the status port 62a is supplied to the access control section 61 from the personal computer 2 through the address bus 55, and the read signal is supplied thereto through the control signal line 56. Thereby, the access control section 61 opens the port of the status port 62a to the side of the personal computer 2, and outputs the status signal, which is sent from the signal line 76c or 76d, to the personal computer 2 through the data bus 2.

In this case, if the storage data vacancy signal is supplied to the personal computer from the buffer 65, the personal computer 2 outputs the address for the IC card data port 62 to the the access control section 61 through the address bus 55, and outputs the write signal to the access control section 61 through the control signal line 56.

As a result, the access control section 61 opens the port of the IC card data port 62 to the side of the buffer 64, and data, which is sent from the data bus 57, is outputted to the data bus 75a.

Moreover, the personal computer 2 outputs transmission data to the IC card data port 62 through the data bus 57. Then, transmission data supplied to the IC card data port 62 is outputted to the buffer 64 through the data bus 75a, and stored therein.

The buffer 64 outputs data of one byte unit in accordance with the transmission enabling signal sent from the serial-parallel converter 67. Then, data outputted from the buffer 64 is supplied to the serial-parallel converter 67 through the data bus 75b, the selector 66, and the data bus 75c. The serial-parallel converter 67 converts data to be supplied to serial data and outputs serial data. Then, serial data outputted from the serial-parallel converter 67 is supplied to the IC card 6 through the signal line 76h, the I/O branch section 68, and the I/O signal line 58a.

When reception data from the IC card 6 is outputted to the personal computer 2, serial data, which is sent from the IC card, is supplied to the serial-parallel converter 67 through the I/O signal line 58a, the I/O branch section 68, and the signal line 76i. Then, if parallel data of one byte is generated in the serial-parallel converter 67, the serial-parallel converter 67 outputs the reception preparation completion signal to the buffer 65 through the signal line 76f.

Also, parallel data, which is generated by the serial-parallel converter 67, is outputted to the buffer 65 through the data bus 75c, the selector 66, and the data bus 75b. Whereby, the buffer 65 stores data, which is sent from the serial-parallel converter 67, by the reception preparation completion signal.

Thereafter, data of one byte unit is sequentially stored in the buffer 65 from the IC card 6.

Then, the storage data presence signal, which serves as the status signal, is outputted to the status port 62a from the buffer 65 through the signal line 76d.

Under this state, the address for the status port 62a is supplied to the access control section 61 from the personal computer 2 through the address bus 55, and the read signal is supplied thereto through the control signal line 56. As a result, the access control section 61 opens the port of the status port 62a to the side of the personal computer 2, and outputs the status signal to the personal computer 2 from the signal line 76c or 76d through the data bus 57.

In this case, if the storage data presence signal is supplied to the personal computer 2 from the buffer 65, the personal computer 2 outputs the address for the IC card data port 62 to the access control section 61 through the address bus 55, and outputs the read signal to the access control section 61 through the control signal line 56.

As a result, the access control section 61 opens the port of the IC card data port 62 to the side of the personal computer 2, and outputs data, which is sent from the data bus 75a, to the data bus 57, whereby the reception data, which is sent from the IC card 6 of the buffer 65, is outputted to the personal computer 2.

For changing the clock by the command sent from the personal computer 2, when the status is checked and data reception and transmission is not performed, the address for the reader/writer control port 63 is supplied to the access control section 61 from the personal computer 2 through the address bus 55 and the write signal is supplied thereto through the control signal line 56. As a result, the access control section 61 opens the port of the reader/writer control port 63 to the side of the control section 69, and outputs data sent from the data bus 57 to the data bus 75d. Whereby, data (clock change command) sent from the personal computer 2 is outputted to the control section 69.

Sequentially, the clock change command, which is sent from the personal computer 2, is supplied to the control section 69 through the data bus 57, the reader/writer control port 63, and the data bus 75d. When the control section 69 detect the reception of the clock change command, the control section 69 outputs the clock change signal to the clock change circuit 72a of the clock control section 72 through the signal line 76l in accordance with the command.

Whereby, the clock change circuit 72a outputs the clock CLK, which is based on the oscillation clock CLK1 or CLK2, to the IC card 6 through the clock signal line 58d and the contact 23(24) in accordance with the clock change signal to be supplied.

Moreover, in the case that the control section 69 determines the short of the power source by the detection signal sent from the VCC control-short detecting section 71 or the extraction of the IC card 6 by the detection signal sent from the microswitches 8A and 8B (STs 12 and 13), the control section 69 outputs the results of these determinations to the personal computer 2 similar to the error output case.

Furthermore, an inactive command is supplied to the control section 69 from the personal computer 2 (STs 15 and 16), the control section 69 determines that the IC card 6 is inactive (ST17), and sequentially outputs the reset signal, the clock-off signal, and the power-off signal to the reset control section 70, the clock control section 72, and the VCC control-short detecting section 71, respectively, whereby the reset control section 70 outputs the reset signal to the IC card 6, the clock control section 72 stops the supply of the clock CLK to the IC card 6 from the clock change circuit 72a, and the VCC control-short detecting section 71 stops the supply of the power voltage Vcc to the IC card 6.

Moreover, the control section 69 outputs the change signal, which corresponds to the inactivation, to the selector 66. Whereby, the selector 66 prohibits the connection between the data buses 75c and 75d. As a result, the data communication between the personal computer 2 and the IC card 6 is prohibited (ST18).

As mentioned above, in the IC card reader/writer, the interface with the host apparatus (personal computer) is made by the connection using the bus. As compared with the conventional reader/writer whose interface with the host apparatus is made by the serial communication connection, the access speed of the host apparatus to the reader/writer is greatly improved.

Moreover, since the port used to control the reader/writer is different from the port which receives and transmits data between the host apparatus and the IC card, complexity, which is caused by distinguishing control of the reader/writer from I/O of the IC card by the conventional transmission protocol, can be simplified, and control of the reader/writer can be performed even when communication between the IC card and the reader/writer is currently being performed.

Moreover, since there are first-in first-out RAM buffers for input and output between the IC card data port and the serial-parallel converter, the output of the telegraphic message to be transmitted from the host apparatus to the IC card or the input of the telegraphic message to be received is not performed regardless of time, which is needed to perform transmission or reception between the host apparatus and the IC card. Due to this, time, which is needed to perform communication between the host apparatus and the IC card, can be reduced.

The above IC card reader/writer has two clock oscillators for the IC card, and the clock change can be performed by control from the host apparatus. A clock change having a pulse of ½ or less of a clock period can be realized with no noise. Whereby, the reader/writer can process various types of IC cards without changing the method of internal control of the reader/writer.

The IC card reader/writer of the present invention comprises one LSI, and the LSI, the connector to the host apparatus, and a contact terminal of the IC card are mounted on one flexible substrate, whereby as compared with the conventional reader/writer, a thinner and smaller reader/writer can be realized.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An IC card reader/writer including control means for controlling a power supply to a detachable IC card, a supply of an operation clock, a reset thereof, and receiving/transmitting means for receiving/transmitting serial data from/to the IC card, wherein a signal is received/transmitted between a host apparatus and said control means and data is received/transmitted between said host apparatus and said receiving/transmitting means, said IC card reader/writer comprising:

serial-parallel converting means, connected to said receiving/transmitting means, for converting parallel data supplying from said host apparatus to serial data transmitting to said IC card, or for converting serial data supplying from said receiving/transmitting means to parallel data corresponding to said host apparatus;

an IC card data port connected between a data bus of said host apparatus and said serial-parallel converting means;

a status port connected between the data bus of said host apparatus and said serial-parallel converting means;

a reader/writer control port connected between the data bus of said host apparatus and said control means; and access control means, connected by an address bus of said host apparatus and a control signal line, having a port selection address supplied from said host apparatus through the address bus, and at least one of read and write signals supplied from said host apparatus through said control signal line, for controlling each of said ports by these signals, said access control means for opening the IC card data port to a side of said host apparatus so as to output data from said serial-parallel converting means to said host apparatus when the port selection address for the IC card data port is supplied to said access control means and the read signal is supplied thereto, said access control means for opening the IC card data port to a side of said serial-parallel converting means so as to output data from said host apparatus to said serial-parallel converting means when the port selection address for the IC card data port is supplied to said access control means and the write signal is supplied thereto, said access control means for opening the status port to the side of said host apparatus so as to output a status signal from said serial-parallel converting means to said host apparatus when the port selection address for the status port is supplied to said access control means and the read signal is supplied thereto, said access control means for opening the reader/writer control port to the side of said host apparatus so as to output data from said control means to said host apparatus when the port selection address for the reader/writer control port is supplied to said access control means and the read signal is supplied thereto, and said access control means for opening the port for the reader/writer control port to a side of said control means so as to output data from said host apparatus to said control means when the port selection address for the reader/writer control port is supplied to said access control means and the write signal is supplied thereto.

2. The IC card reader/writer according to claim 1, wherein two kinds of clocks are provided as an operation clock of said IC card, and there is provided changing means for changing a clock to be supplied to said IC card by said control means in accordance with data outputted from said host apparatus to said control means.

3. The IC card reader/writer according to claim 1, wherein said control means, said receiving/transmitting means, said serial-parallel converting means, said IC card data port, said status port, said reader/writer control port, and said access control means are formed by one integrated circuit.

4. The IC card reader/writer according to claim 1, wherein said control means, said receiving/transmitting means, said serial-parallel converting means, said IC card data port, said status port, said reader/writer control port, and said access control means are formed by one integrated circuit, and a contact for connecting to said IC card formed on a flexible substrate, and a connector for connecting to said host apparatus are directly connected to said integrated circuit.

5. An IC card reader/writer for receiving an IC card detachably from a host apparatus and inputting data from said host apparatus and outputting data to said host apparatus, comprising:

a connector connected to an address bus of said host apparatus and a data bus;

a first I/O port, connected to said data bus of said host apparatus through said connector, for enabling data communication between said host apparatus and said IC card;

communication means for performing data communication between said host apparatus and said IC card through said first I/O port;

a second I/O port, connected to said data bus of said host apparatus through said connector, for receiving an instruction of reading/writing from said host apparatus;

a controller for performing communication of data to control reading/writing operation with said host apparatus through the second I/O port; and selecting means, connected to an address bus of said host apparatus through said connector, for selecting one of said first I/O port and said second I/O port based on an address signal received from said host apparatus, thereby enabling data communication between said host apparatus and one of said communication means and said controller.

* * * * *